(12) United States Patent
Martinez-Eiroa et al.

(10) Patent No.: US 11,188,542 B2
(45) Date of Patent: Nov. 30, 2021

(54) CONDITIONAL PROCESSING BASED ON DATA-DRIVEN FILTERING OF RECORDS

(71) Applicant: salesforce.com, inc., San Francisco, CA (US)

(72) Inventors: Carlos Ramirez Martinez-Eiroa, Naperville, IL (US); Kevin Bromer, Baltimore, MD (US)

(73) Assignee: salesforce.com, inc., San Francisco, CA (US)

( * ) Notice: Subject to any disclaimer, the term of this patent is extended or adjusted under 35 U.S.C. 154(b) by 490 days.

(21) Appl. No.: 15/145,487

(22) Filed: May 3, 2016

(65) Prior Publication Data

US 2017/0322938 A1 Nov. 9, 2017

(51) Int. Cl.
*G06F 16/2455* (2019.01)
*G06F 16/22* (2019.01)
*G06F 16/9535* (2019.01)

(52) U.S. Cl.
CPC .... *G06F 16/24565* (2019.01); *G06F 16/2246* (2019.01); *G06F 16/9535* (2019.01)

(58) Field of Classification Search
CPC ........... G06F 17/3051; G06F 17/30327; G06F 17/30867
USPC ........................................................ 707/754
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

OTHER PUBLICATIONS

U.S. Appl. No. 13/986,251, filed Apr. 16, 2013.

*Primary Examiner* — Alicia M Antoine
(74) *Attorney, Agent, or Firm* — Dergosits & Noah LLP; Todd A. Noah

(57) ABSTRACT

Conditional processing based on data-driven filtering of records is described. A system stores a corresponding identifier in a data structure for each of a data manipulation action, an object, a filter field, a filter condition, and a process. The system receives a request to perform the data manipulation action for the object. The system determines, for each record based on the object, whether the filter field associated with a corresponding record satisfies the filter condition. The system identifies, for each record based on the object, a corresponding record as an included record that should be included for subsequent processing in response to a determination that the filter field associated with the corresponding record either satisfies the filter condition or does not satisfy the filter condition. The system executes the process on each included record.

17 Claims, 4 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,571,171 B1* | 8/2009 | Shaw ............... G06Q 10/10 |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,049,138 B1* | 8/2018 | Falor ................ G06F 17/3053 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0125482 A1* | 5/2009 | Peregrine ............... G06F 16/951 |
| 2009/0177744 A1 | 7/2009 | Marlow et al. |
| 2012/0102153 A1* | 4/2012 | Kemp ................ G06F 16/248 709/219 |
| 2012/0166447 A1* | 6/2012 | Nice ................ G06F 16/90335 707/746 |
| 2012/0233137 A1 | 9/2012 | Jakobson et al. |
| 2013/0145323 A1* | 6/2013 | Ward ................ G06Q 10/06 715/835 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0100677 A1* | 4/2015 | Matsumoto ............ H04L 67/10 709/223 |
| 2015/0172563 A1 | 6/2015 | Jakobson et al. |
| 2015/0199367 A1* | 7/2015 | Hammer ........... G06F 17/30085 707/654 |
| 2016/0358266 A1* | 12/2016 | Dovas ................ G06Q 10/0637 |
| 2017/0235436 A1* | 8/2017 | Hooton ................ G06F 3/0482 705/7.11 |

\* cited by examiner

CONDITIONAL PROCESSING BASED ON DATA-DRIVEN FILTERING OF RECORDS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system may execute an application's processes on records stored by the database system. If a system administrator needs to change which records a process executes on, the database administrator may have to wait on a computer programmer to complete a lengthy and error-prone procedure. For example, a lender of student loans has a database system that executes an application process which identifies students who have just graduated, and which sends detailed repayment information to these recent graduates. After many recent graduates complain that they did not receive this detailed repayment information while they were still students, the system administrator decides that the process which sends this information to recent graduates should also send this information to students during their last year of study. Although data identifying students who are in their last year of study is readily available in the lender's database system, the system administrator has to wait for a computer programmer to modify the code of the specific process, compile the code, and load the code into the lender's database system. This wait may be lengthy and may need to be repeated if any errors occur during this complex procedure.

BRIEF SUMMARY

In accordance with embodiments, there are provided systems and methods for conditional processing based on data-driven filtering of records. A system stores a corresponding identifier in a data structure for each of a data manipulation action, an object, a filter field, a filter condition, and a process. The system receives a request to perform the data manipulation action for the object. The system determines, for each record based on the object, whether the filter field associated with a corresponding record satisfies the filter condition. The system identifies, for each record based on the object, a corresponding record that should be included for subsequent processing as an "included record" in response to a determination that the filter field associated with the corresponding record either satisfies the filter condition or does not satisfy the filter condition, depending on configuration. The system executes the process on each included record.

For example, a database system stores the identifiers received from a system administrator for an insert action, an account object, a name field, a filter condition of "Acme Corporation" being present in the name field, and an ADDR_Account_TDTM process. When the database system receives a request to insert an account object, the database system determines whether each account record's name field has "Acme Corporation" in the name field thereby satisfying the filter condition of "Acme Corporation." The database system identifies every account record that has "Acme Corporation" in its name field, and excludes these records from subsequent processing. The system also identifies every account record that does not have "Acme Corporation" in its name field as an "included record," and then the ADDR_Account_TDTM process executes these included records. Instead of having to depend upon a computer programmer changing code, the system administrator simply entered some data to get the ADDR_Account_TDTM process to exclude Acme Corporation account records, i.e., those records having "Acme Corporation" in the name field, when executing an insert account operation. The database system is flexible enough to enable a system administrator to control which processes execute on which records by simply modifying data which subsequently acts as metadata for the records.

While one or more implementations and techniques are described with reference to an embodiment in which conditional processing based on data-driven filtering of records is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for conditional processing based on data-driven filtering of records. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for conditional processing based on data-driven filtering of records will be described with reference to example embodiments. The following detailed description will first describe a method for conditional processing based on data-driven filtering of records. Next, frames of example user interfaces for conditional processing based on data-driven filtering of records are described.

Figure 1:
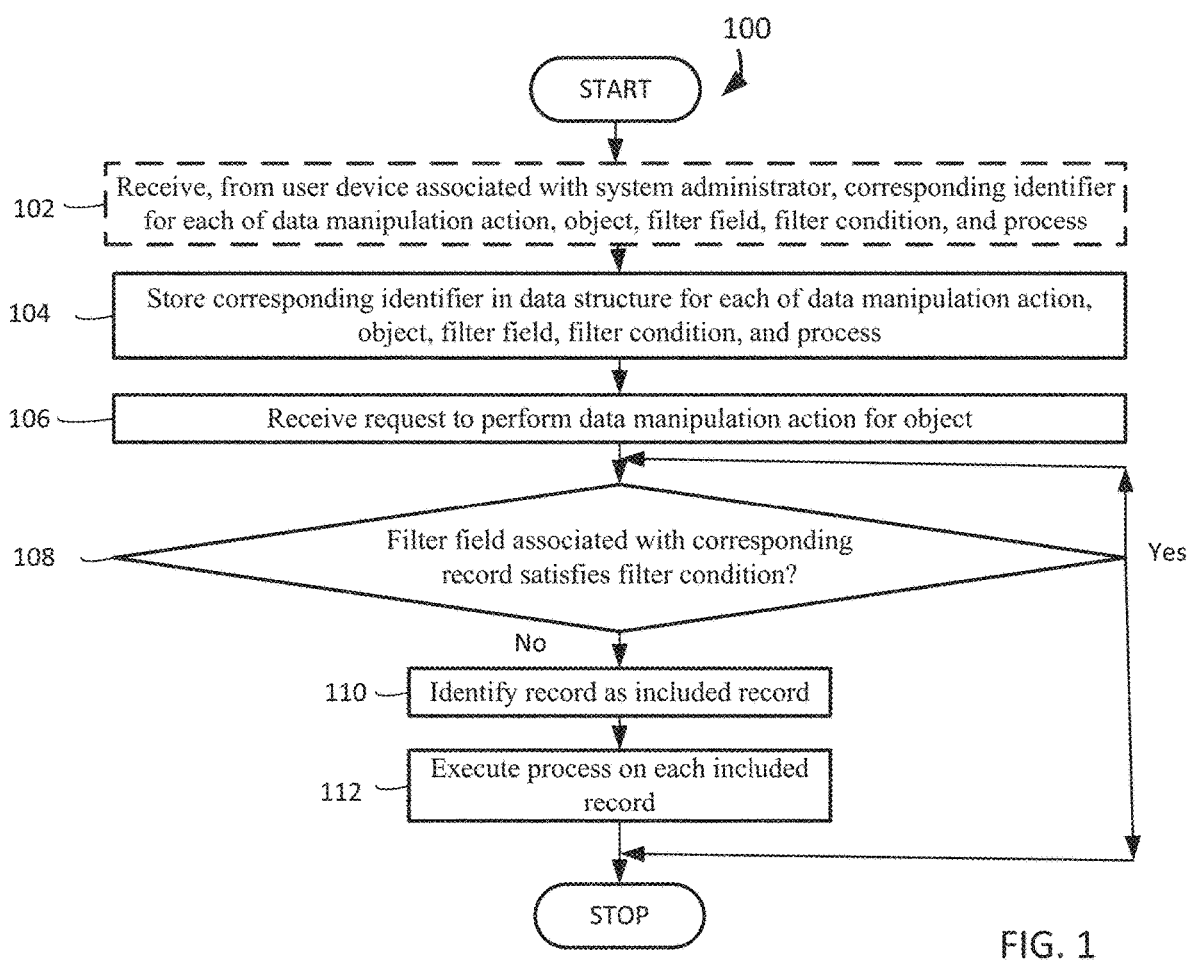
FIG. 1 is an operational flow diagram illustrating a high level overview of a method for conditional processing based on data-driven filtering of records, in an embodiment.

FIG. 1 is an operational flow diagram illustrating a high level overview of a method 100 for conditional processing based on data-driven filtering of records. As shown in FIG. 1, a system may filter records based on data submitted by a system administrator, and then process only the records that the filter condition identified for processing inclusion. In the following description, each of the blocks 102-112 in the method 100 includes a general description of an action taken by a database system, followed by an example of the action. For purposes of clarity, the first example herein will be referred to as the "Acme Corporation" example and the second example will be referred to as the "Household" example.

Figure 2:
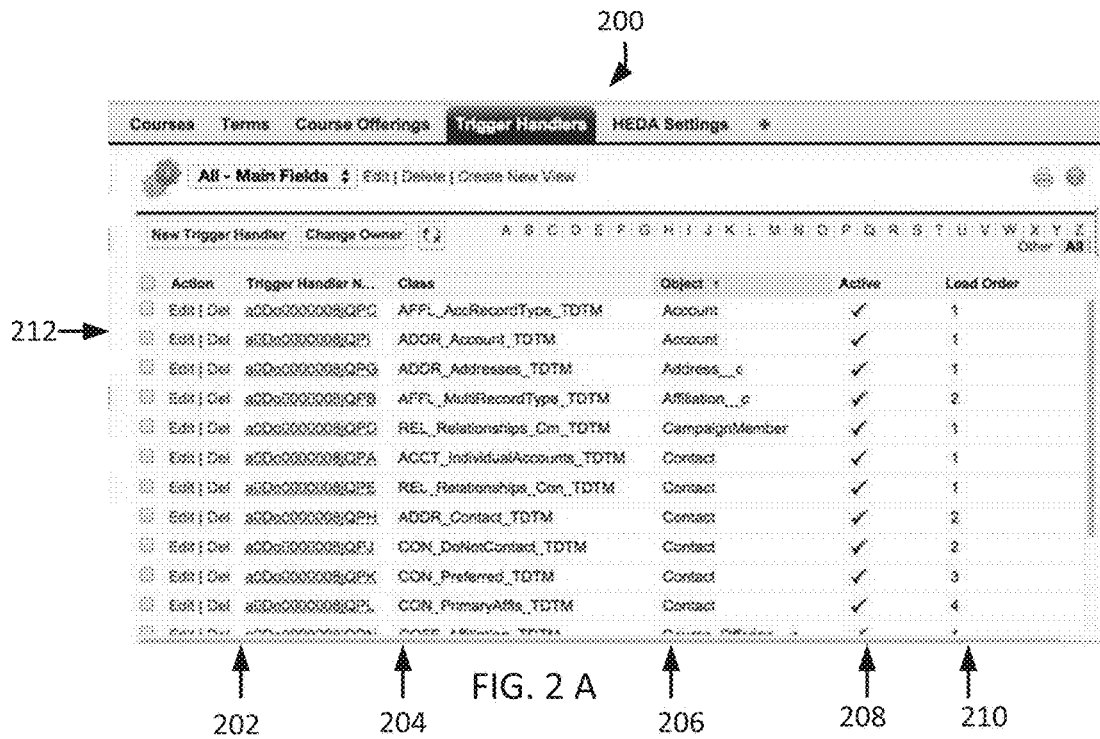
FIGS. 2A and B are screen shots illustrating frames of example user interface screens of display devices for conditional processing based on data-driven filtering of records, in an embodiment.
Figure 2:
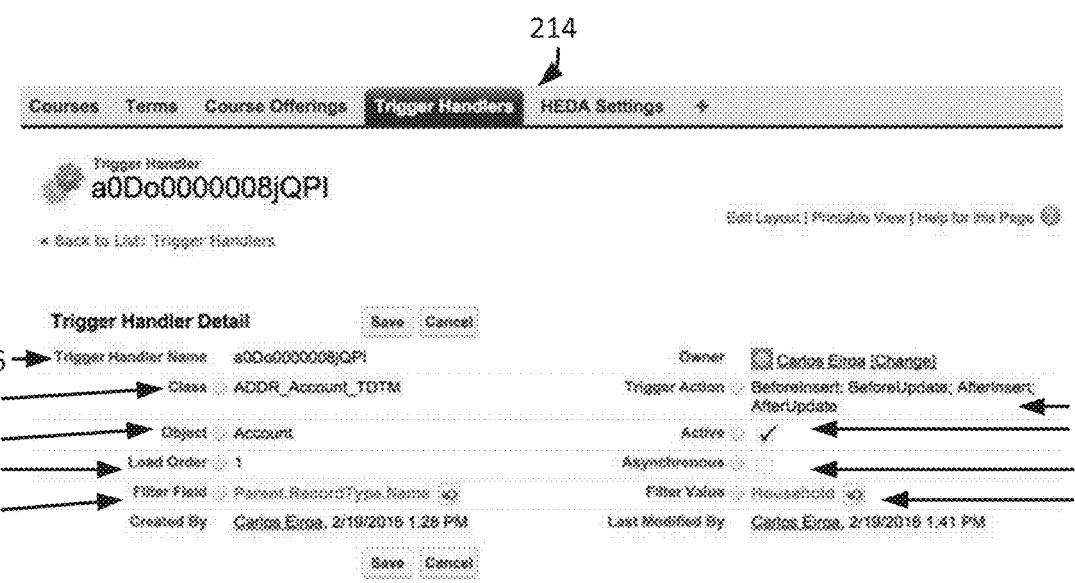

A corresponding identifier for each of a data manipulation action, an object, a filter field, a filter condition, and a process is optionally received from a user device associated with a system administrator, block 102. In the "Acme Corporation" example, the database system receives the identifiers for an insert action, an account object, a name field, a filter condition of "Acme Corporation," and an ADDR_Account_TDTM process from a system administrator. In the "Household" example, the database system receives the identifiers for the set of actions: before insert, before update, after insert, and after update, the account object, a "Parent.RecordType.Name" field, a filter condition of "Household," and the ADDR_Account_TDTM process from a system administrator. A set of such identifiers may be referred to as a trigger handler record because the data specified by these identifiers handles or controls the behavior of an application's process when the application's process is triggered for an object's records. A screen shot illustrating a frame of example trigger handler record is depicted in FIG. 2B and described below in the description of FIG. 2B.

Having received a set of corresponding identifiers from a system administrator, a corresponding identifier is stored in a data structure for each of a data manipulation action, an object, a filter field, a filter condition, and a process, block 104. In the "Acme Corporation" example, the database system stores the identifiers received from a system administrator for the insert action, the account object, the name field, the filter condition of "Acme Corporation," and the ADDR_Account_TDTM process into a trigger handler record table. A screen shot illustrating a frame of example trigger handler record table is depicted in FIG. 2A and described below in the description of FIG. 2A. In the "Household" example, the database system stores the identifiers received from a system administrator for the set of actions: before insert, before update, after insert, and after update, the account object, the "Parent.RecordType.Name" field, the filter condition of "Household," and the ADDR_Account_TDTM process into the trigger handler record table.

After storing identifiers for a data manipulation action and an object, a request is received to perform the data manipulation action for the object, block 106. In both the "Acme Corporation" and "Household" examples, the database system receives a request to insert an account object. When the database system receives a request to perform a data manipulation action for an object, the database system queries the trigger handler record table to identify all of the active processes that will execute for the specified object, sorts these processes by load order, and dynamically instantiates each of these processes. The example trigger handler record table which is described below in reference to FIG. 2A, and depicted in FIG. 2A, lists processes which are identified as active, and their respective load orders. If an identified and active process has no specified filter field and condition, the database system passes all of the specified object's records to the process, subsequently gathers all of the object's processed records, performs the requested data manipulation action on the object's processed records, and then performs any necessary error processing. However, if a trigger handler record specifies the optional filter field and condition for an identified and active process, then the method 100 continues to block 108.

In response to a request to perform a data manipulation action on an object, a determination is made for each record based on the object, whether a filter field associated with a corresponding record satisfies a filter condition, block 108. In the "Acme Corporation" example, the database system determines whether each account record's name field satisfies the filter condition of "Acme Corporation." Although this example describes a value of a field satisfying a filter condition by implicitly equaling a specified filter value, such as "Acme Corporation," the filter condition may be based on other mathematical relationships, such as an equality mathematical relationship, a non-equality mathematical relationship, a greater than mathematical relationship, or a less than mathematical relationship, or any combination thereof. For example, a system administrator creates a formula for a filter condition which specifies that the filter condition is satisfied if the value of a record's field is either greater than or equal to a specified amount. In another example, a system administrator creates a formula for a filter condition which specifies that the filter condition is satisfied if the value of a specified record field is less than the value of another specified record field. In yet another example, a system administrator creates a formula for a filter condition which specifies that the filter condition is satisfied if the value of a specified record field has been changed after a certain time.

A system administrator may create a formula for a filter condition specifying that the filter condition is satisfied based on the value of a field that is a part of a record, such as the examples described above, or based on the value of a field referenced via the record, but which is not actually a part of the record. Referring to the "Household" example, a trigger handler record specifies the account object, specifies the filter condition "Household" and specifies the filter field "Parent.RecordType.Name," which references a field that is not part of the account object's records specified by the trigger handler record. The filter field "Parent.RecordType.Name" specifies an account record that has a parent record type having a name of "Household" satisfies the filter condition. The database system determines whether the filter field "Parent.RecordType.Name" of three account records satisfies the filter condition "Household."

The following three account records are: a first account record that does not have a parent record, a second account record that has a parent record type having the name of "Household," and a third account record having a parent record type that has the name of "Business." After examining the filter fields associated with these three account records, only the second account record that has a parent record type having the name of "Household" satisfies the filter condition. Although this example describes a filter field formula that specifies a record field for an object having a parent relationship for the specified object, the filter field formula may specify a record field for an object that has any type of hierarchical relationship for an object, such as a child relationship, a descendent relationship, or an ancestor relationship.

Although this example describes a value of a field satisfying a filter condition by implicitly equaling a specified filter value, such as "Household," the filter condition may be based on other mathematical relationships, such as an equality mathematical relationship, a non-equality mathematical relationship, a greater than mathematical relationship, or a less than mathematical relationship, or any combination thereof. For example, a system administrator creates a formula for a filter condition which specifies that the filter condition is satisfied if the value of a child record's field is either greater than or equal to a specified amount. In another example, a system administrator creates a formula for a filter condition which specifies that the filter condition is satisfied if the value of a grandparent record field is less than the value of a grandchild record field. In yet another example, a system administrator creates a formula for a filter condition which specifies that the filter condition is satisfied if the value of a great grandparent record field has been changed after a certain time.

In a more complex hierarchical relationship example than the "Household" example, a trigger handler record specifies the Course_Enrollment_c object, specifies the filter condition's value "true" and specifies the filter field "CourseOff_c.ParentCourse_c.Department_c.IsActive_c." All of the elements in this filter field chain are field names, but these field names do not necessarily correspond to object names. The field at the end of the chain, IsActive_c, does not reference any other object. The other three fields in this filter field chain reference objects, but none of these other three fields matches an object in this example. The mapping of field names to objects is CourseOff_c to Course_Offering_c, ParentCourse_c to Course_c, and Department_c to Account. The database system identifies the field type of IsActive_c because the value of IsActive_c is stored as the string "true," such that the database system needs to transform this stored value to a Boolean value for comparison with the specified filter value.

The database system executes an algorithm recursively until the algorithm is able to identify a valid object with a valid field as part of the filter field chain. First, the algorithm determines whether the last two fields at the end of the filter field chain are a valid object-field pair. For example, the algorithm determines whether Department_c is an object with an IsActive_c field. If the last two fields at the end of the filter field chain are a valid object-field pair, the algorithm transforms the value of the field if necessary, and then filters each record corresponding to the object by comparing the filter condition and value to the each record's specified field's value. If the last two fields at the end of the filter field chain are not a valid object-field pair, the algorithm determines whether the third-to-last field and the second-to-last field relative to the end of the filter field chain are a valid object-field pair.

For example, the algorithm determines whether Parent-Course_c is an object with a Department__c field. The algorithm continues this left-ward navigation of the filter field chain to identify a valid object-field pair. If this left-ward navigation of the filter field chain does not identify a valid object-field pair, the algorithm starts with the specified object and the field at the beginning of the filter field chain, and navigates the filter field chain in the reverse direction, creating a chain link object for each field in the filter field chain. Each chain link object can store the name of its field, the type of its field, any hierarchical object referenced (such as a parent object), and the field's position in the filter field chain. Subsequently, the algorithm transforms the value of the last field if necessary, and then filters each record corresponding to the object by comparing the filter condition and value to the each record's specified field's value.

Returning back to the "Acme Corporation" and Household" examples, when the filter field that is associated with a corresponding record satisfies the filter condition, the record is identified as an "excluded record" and either the method 100 remains at block 108 to determine whether the filter field associated with the object's next record satisfies the filter condition, or the method terminates when the object has no more records for which such a determination is yet to be made. When the filter field that is associated with a corresponding record does not satisfy the filter condition, the corresponding record is identified as an "included record" for subsequent processing and the method 100 continues to block 110.

In the "Acme Corporation" example, the determination by the database system of whether the filter field associated with a corresponding record satisfies the filter condition consists of identifying as an "excluded record" every account record that has "Acme Corporation" in its name field, i.e., satisfying the filter condition. The determination may also consist of identifying as an "included record" every account record that does not have "Acme Corporation" in its name field, i.e., not satisfying the filter condition. The result of this determination is that only the "included records" are subsequently processed. In the "Household" example, the database system may identify as an "excluded record," every account record that has "Household" as its parent record type's name, i.e. satisfying the filter condition. The database system may also identify as an "included record" for subsequent processing, every account record that does not include "Household" as its parent record type's name, i.e. not satisfying the filter condition. This "included record" would be the first account record that does not have a parent record and the third account record that has a parent record type having the name of "Business."

Although the preceding examples describe records that satisfy a filter condition as being "excluded records" and records that fail to satisfy a filter condition as being "included records" for subsequent processing, one of skill in the art would appreciate that the system could be configured such that records satisfying a filter condition may be identified as "included records" and records that fail to satisfy a filter condition may be identified as "excluded records."

In an embodiment where the "included records" are those records that fail to satisfy the filter condition and are thus included for subsequent processing, when each included record has been identified, the process is executed on each included record, block 112. In embodiments, this can include the database system's ADDR_Account_TDTM process executing on the records that do not, for example, haveAcme Corporation in their name field.

Further, the database system's ADDR_Account_TDTM process execute on the first account record that does not have a parent record, and executes on the third account record that has "Business" as its parent record type name. The database system included these two records for this processing because neither of these records satisfies the filter condition by having "Household" as its parent record type's name.

Instead of having to depend upon a computer programmer changing code, the system administrator simply entered some data to get the ADDR_Account_TDTM process to exclude specified account records when executing an insert account operation. The database system is flexible enough to enable a system administrator to control which processes execute on which records by simply modifying data which subsequently acts as metadata for the records. Similarly, third-party applications can also control which processes execute on which records by simply modifying the data which subsequently acts as metadata for the records.

The method 100 may be repeated as desired. Although this disclosure describes the blocks 102-112 executing in a particular order, the blocks 102-112 may be executed in a different order. In other implementations, each of the blocks 102-112 may also be executed in combination with other blocks and/or some blocks may be divided into a different set of blocks.

FIGS. 2A and 2B are screen shots illustrating frames of example user interface screens of display devices for conditional processing based on data-driven filtering of records in an embodiment. FIG. 2A is a screen shot illustrating a frame 200 of an example trigger handler record table. The data in the table may be stored by a custom object, by a custom setting, or any suitable persistent data structure. The frame 200 includes a trigger handler record column 202, which lists trigger handler records such as a0Do0000008jQPj, a class column 204, which lists processes such as ADDR_Account_TDTM, an object column 206, which lists objects such as account, an active column 208, which lists whether the corresponding trigger handler record is active, and a load order column 210, which lists a load order for the corresponding processes to run on an object, such as the load orders 1, 2, 3, and 4 for various processes to run on the contact object.

If the user selects the trigger handler record name 212 for a0Do0000008jQPj, the database system responds with the frame 214 of an example trigger handler record, as illustrated in FIG. 2B. The frame 214 includes the trigger handler record name 216, which is a0Do0000008jQPj, the class 218, which is the ADDR_Account_TDTM process, the trigger action 220, which is the set of data manipulation actions: before insert, before update, after insert, and after update, the object 222, which is the account object, and the active/inactive status 224, which is active. The frame 214 also includes the load order 226, which is for 1 for ADDR_Account_TDTM on the account object, the asynchronous/synchronous status 228, which is synchronous, the filter field 230, which is Parent,RecordType.Name, and the filter value 232, which is the filter condition of equaling "Household." Each trigger handle may also store any custom metadata which may be required for implementation.

The frame 214 may occupy less screen space than the frame 200, and appear as a pop-up frame super-imposed partially on top of the frame 200, or the frame 214 may occupy the same screen space as the frame 200, and completely cover the frame 200 when appearing as a pop-up frame super-imposed completely on top of the frame 200.

The frames 200 and 214 may be part of a larger display screen that includes fields for users to enter commands to create, retrieve, edit, and store records. The database system may output a display screen that includes the frames 200 and 214 in response to searches based on search criteria input via a user interface. Because the frames 200 and 214 are samples, the frames 200 and 214 could vary greatly in appearance. For example, the relative sizes and positioning of the text is not important to the practice of the present disclosure. The frames 200 and 214 can be depicted by any visual display, but are preferably depicted by a computer screen. The frames 200 and 214 could also be output as reports and printed or saved in electronic format, such as PDF. The frames 200 and 214 can be part of a personal computer system and/or a network, and operated from system data received by the network, and/or on the Internet. The frames 200 and 214 may be navigable by a user.

Typically, a user can employ a touch screen input or a mouse input device to point-and-click to a location on the frames 200 and 214 to manage the text on the frames 200 and 214, such as a selection that enables a user to edit the text. Alternately, a user can employ directional indicators, or other input devices such as a keyboard. The text depicted by the frames 200 and 214 are examples, as the frames 200 and 214 may include a much greater amount of text. The frames 200 and 214 may also include fields in which a user can input textual information.

System Overview

Figure 3:
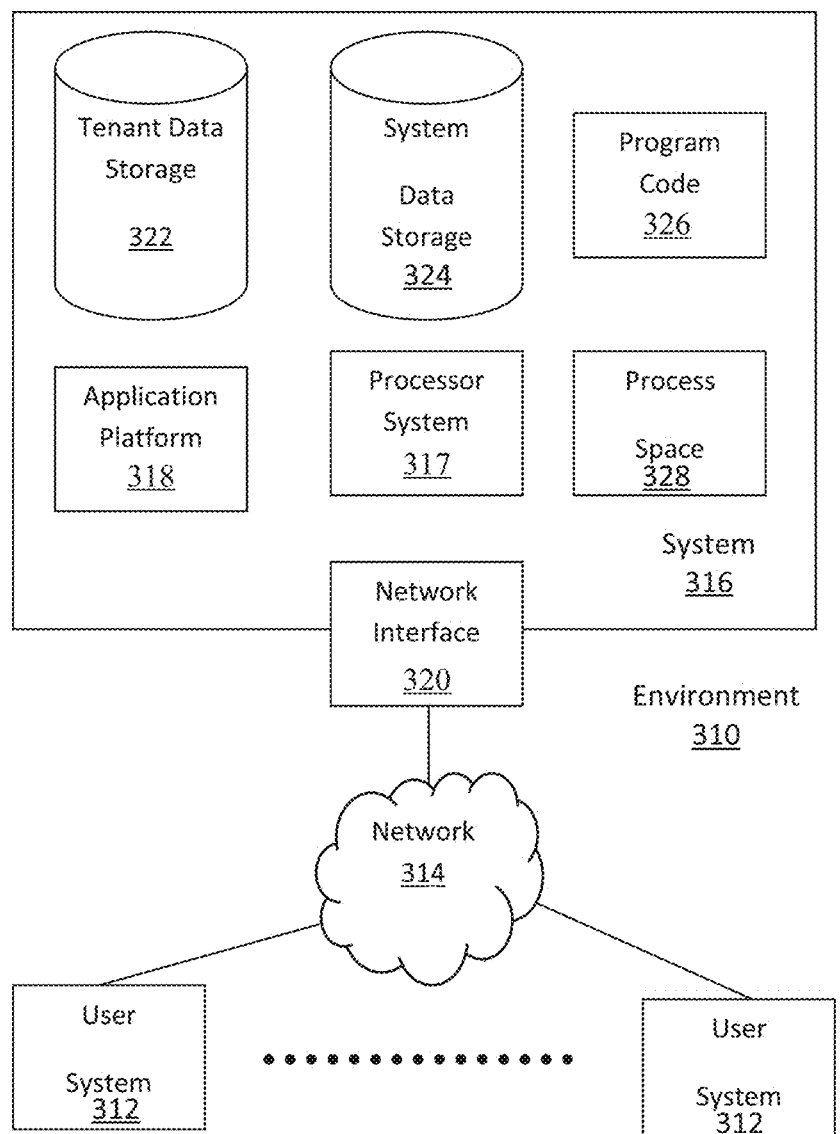
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units.

A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data.

Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, JavaTM, JavaScript, ActiveX, any other scripting language, such as VBScript, and many other programming languages as are well known may be used. (JavaTM is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
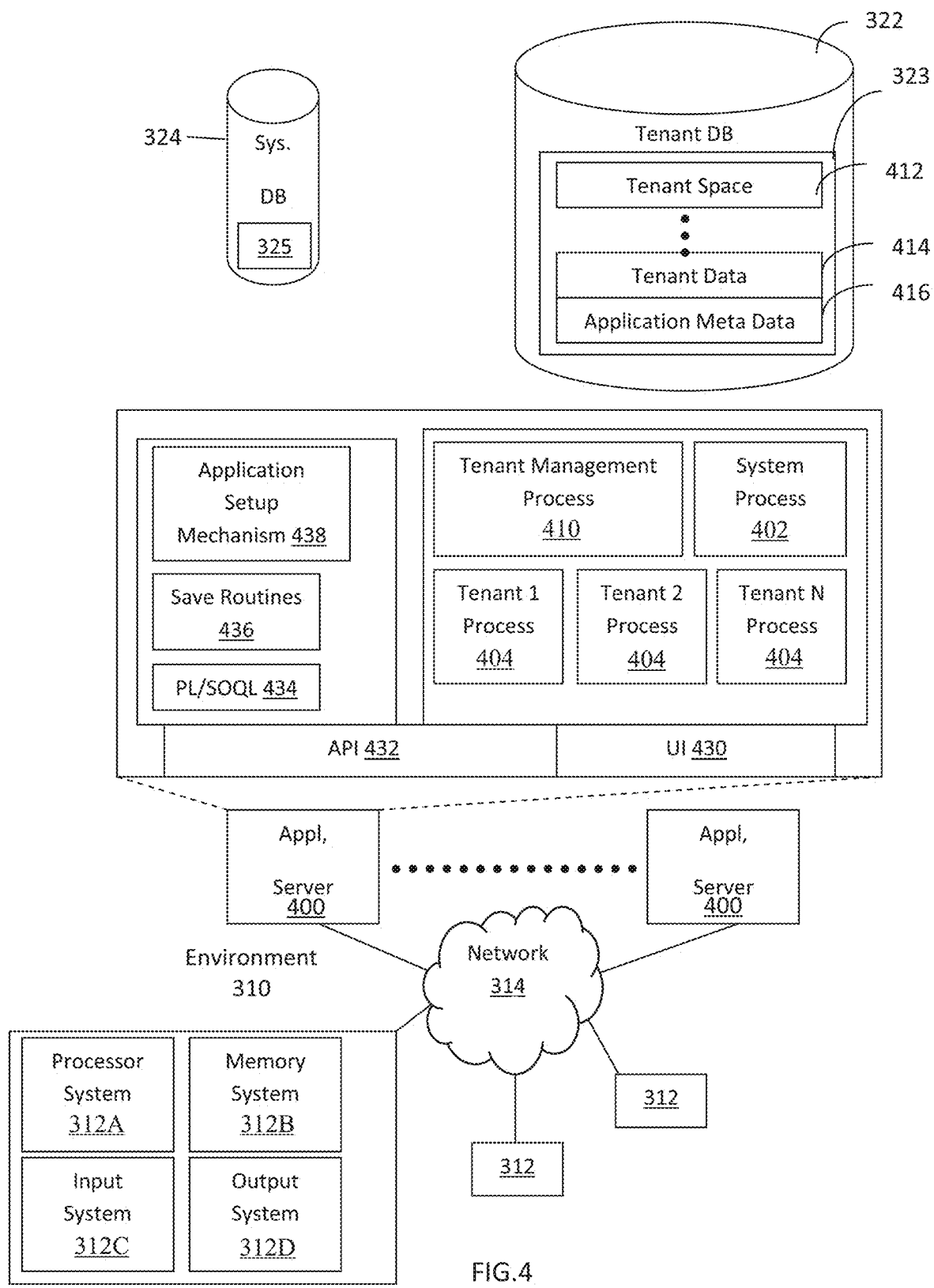
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 4001-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks.

As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more OracleTM databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Patent No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for conditional processing based on data-driven filtering of records, the system comprising:
   one or more processors; and
   a non-transitory computer readable medium storing a plurality of instructions, which when executed, cause the one or more processors to:
      receive, from a user device associated with a system administrator, a set of corresponding identifiers, the set of corresponding identifiers including an identifier for a data manipulation action for an object, an identifier for the object, an identifier for a filter field, an identifier for a filter condition, and an identifier for a process that executes the data manipulation action for the object in an application hosted by the system;
      store the set of corresponding identifiers as a trigger handler record in a trigger handler record table;
      receive a request for the application to perform the data manipulation action for the object;
      determine, for each object record that is based on the object, whether the filter field which is identified in the trigger handler record and which is within a corresponding object record satisfies the filter condition identified in the trigger handler record, in response to receiving the request to perform the data manipulation action for the object;
      identify, for each object record that is based on the object, the corresponding object record as an included object record that should be included for subsequent processing in response to a determination that the filter field identified in the trigger handler record and within the corresponding object record satisfies the filter condition identified in the trigger handler record; and
      execute the process, in the application hosted by the system, on each included object record, wherein executing the process comprises querying the trigger handler record table to identify processes that will execute for the object, sorting the processes by load order and dynamically instantiating each of these processes thereby causing a data manipulation action for each identified object record.

2. The system of claim 1, wherein the filter condition specifies a mathematical relationship to a filter value, and the specified mathematical relationship comprises at least one of an equality mathematical relationship, a non-equality mathematical relationship, a greater than mathematical relationship, and a less than mathematical relationship.

3. The system of claim 1, wherein the object record includes the filter field which is associated with the object record.

4. The system of claim 1, wherein the corresponding identifier of the filter field comprises both an identifier of a field in the object and an identifier of a field in another object, the identifier of the field in the object references the other object, and the object has a hierarchical relationship with the other object.

5. The system of claim 4, wherein the hierarchical relationship comprises at least one of a parent-child hierarchical relationship, a child-parent hierarchical relationship, an ancestor-descendent hierarchical relationship, and a descendent-ancestor hierarchical relationship.

6. The system of claim 1, wherein determining whether the filter field which is identified in the trigger handler record and which is within the corresponding object record satisfies the filter condition identified in the trigger handler record comprises creating a corresponding chain link object for each identifier in a sequence of identifiers in the corresponding identifier for the filter field, and each corresponding chain link object stores a corresponding field identifier, a corresponding identifier of a referenced hierarchical relationship object, and a corresponding position in the sequence of identifiers.

7. A computer program product comprising a non-transitory computer-readable medium having computer-readable program code embodied therein to be executed by one or more processors, the program code including instructions to:
   receive, from a user device associated with a system administrator, a set of corresponding identifiers, the set of corresponding identifiers including an identifier for a data manipulation action for an object, an identifier for the object, an identifier for a filter field, an identifier for a filter condition, and an identifier for a process that executes the data manipulation action for the object in an application hosted by the system;
   store the set of corresponding identifiers as a trigger handler record in a trigger handler record table;
   receive a request for the application to perform the data manipulation action for the object;
   determine, for each object record that is based on the object, whether the filter field which is identified in the trigger handler record and which is within a corresponding object record satisfies the filter condition identified in the trigger handler record, in response to receiving the request to perform the data manipulation action for the object;
   identify, for each object record that is based on the object, the corresponding object record as an included object record that should be included for subsequent processing in response to a determination that the filter field identified in the trigger handler record and within the corresponding object record satisfies the filter condition identified in the trigger handler record; and
   execute the process, in the application hosted by the system, on each included object record, wherein executing the process comprises querying the trigger handler record table to identify processes that will execute for the object, sorting the processes by load order and dynamically instantiating each of these processes thereby causing a data manipulation action for each identified object record.

8. The computer program product of claim 7, wherein the filter condition specifies a mathematical relationship to a filter value, and the specified mathematical relationship comprises at least one of an equality mathematical relationship, a non-equality mathematical relationship, a greater than mathematical relationship, and a less than mathematical relationship.

9. The computer program product of claim 7, wherein the object record includes the filter field which is associated with the object record.

10. The computer program product of claim 7, wherein the corresponding identifier of the filter field comprises both an identifier of a field in the object and an identifier of a field in another object, the identifier of the field in the object references the other object, and the object has a hierarchical relationship with the other object.

11. The computer program product of claim 10, wherein the hierarchical relationship comprises at least one of a parent-child hierarchical relationship, a child-parent hierarchical relationship, an ancestor-descendent hierarchical relationship, and a descendent-ancestor hierarchical relationship.

12. The computer program product of claim 7, wherein determining whether the filter field which is identified in the trigger handler record and which is within the corresponding object record satisfies the filter condition identified in the trigger handler record comprises creating a corresponding chain link object for each identifier in a sequence of identifiers in the corresponding identifier for the filter field, and each corresponding chain link object stores a corresponding field identifier, a corresponding identifier of a referenced hierarchical relationship object, and a corresponding position in the sequence of identifiers.

13. A method for conditional processing based on data-driven filtering of records, the method comprising:

receiving, by a database system, a set of corresponding identifiers, the set of corresponding identifiers including an identifier for a data manipulation action for an object, an identifier for the object, an identifier for a filter field, an identifier for a filter condition, and an identifier for a process that executes the data manipulation action for the object in an application hosted by the system;

storing, by the database system, the set of corresponding identifiers as a trigger handler record in a trigger handler record table;

receiving, by the database system, a request for the application to perform the data manipulation action for the object;

determining, by the database system, for each object record that is based on the object, whether the filter field which is identified in the trigger handler record and which is within a corresponding object record satisfies the filter condition identified in the trigger handler record, in response to receiving the request to perform the data manipulation action for the object;

identifying, by the database system, for each object record that is based on the object, the corresponding object record as an included object record that should be included for subsequent processing in response to a determination that the filter field identified in the trigger handler record and within the corresponding object record satisfies the filter condition identified in the trigger handler record; and executing, by the database system, the process, in the application hosted by the system, on each included object record, wherein executing the process comprises querying the trigger handler record table to identify processes that will execute for the object, sorting the processes by load order and dynamically instantiating each of these active processes thereby causing a data manipulation action for each identified object record.

14. The method of claim 13, wherein the filter condition specifies a mathematical relationship to a filter value, and the specified mathematical relationship comprises at least one of an equality mathematical relationship, a non-equality mathematical relationship, a greater than mathematical relationship, and a less than mathematical relationship.

15. The method of claim 13, wherein the object record includes the filter field which is associated with the object record.

16. The method of claim 13, wherein the corresponding identifier of the filter field comprises both an identifier of a field in the object and an identifier of a field in another object, the identifier of the field in the object references the other object, the object has a hierarchical relationship with the other object, and the hierarchical relationship comprises at least one of a parent-child hierarchical relationship, a child-parent hierarchical relationship, an ancestor-descendent hierarchical relationship, and a descendent-ancestor hierarchical relationship.

17. The method of claim 13, wherein determining whether the filter field which is identified in the trigger handler record and which is within the corresponding object record satisfies the filter condition identified in the trigger handler record comprises creating a corresponding chain link object for each identifier in a sequence of identifiers in the corresponding identifier for the filter field, and each corresponding chain link object stores a corresponding field identifier, a corresponding identifier of a referenced hierarchical relationship object, and a corresponding position in the sequence of identifiers.

\* \* \* \* \*